UNITED STATES PATENT OFFICE.

CARL LUDWIG MÜLLER, OF LUDWIGSHAFEN-ON-THE-RHINE, BAVARIA, GERMANY, ASSIGNOR TO THE BADISCHE ANILIN AND SODA FABRIK, OF MANNHEIM, GERMANY.

MANUFACTURE OF SULPHONATED PURPLE DYE-STUFFS FROM BASIC ROSANILINE.

SPECIFICATION forming part of Letters Patent No. 353,264, dated November 23, 1886.

Application filed September 25, 1886. Serial No. 214,547. (Specimens.)

*To all whom it may concern:*

Be it known that I, CARL LUDWIG MÜLLER, a subject of the King of Bavaria, residing at Ludwigshafen-on-the-Rhine, in the Kingdom of Bavaria and Empire of Germany, have invented new and useful Improvements in the Manufacture of a Sulphonated Purple Dye-Stuff or Coloring-Matter from the Basic Rosaniline Derivative Resulting from the Condensation of Tetraethyldiamidobenzophenone with Methyldiphenylamine, of which the following is a specification.

This invention relates to the manufacture of a sulphonated purple dye-stuff or coloring-matter from the basic rosaniline derivative resulting from the condensation of tetraethyldiamidobenzophenone with methyldiphenylamine.

In carrying out my invention I take about forty parts, by weight, of tetraethyldiamidobenzophenone and mix the same intimately with 22.5 parts, by weight, of methyldiphenylamine and three parts, by weight, of toluol. I then quickly add twelve parts, by weight, of oxychloride of phosphorus. The mixture thus produced is then heated under constant agitation until its inside temperature has reached about 100° centigrade, at which temperature it is to be kept during the space of about ten hours. The bronze-colored "melt" thus obtained is boiled with about thirty parts of water until the toluol is evaporated; then common salt is added. The resulting acid and saline solution, after being allowed to cool down and settle, is then separated from the undissolved residue by decantation. The said undissolved residue is afterward exhausted with boiling water. The dark-purple solution thus obtained is filtered at a boiling-heat and precipitated while hot with common salt. The resulting precipitate is washed and dried.

In order to convert the basic rosaniline derivative thus produced (and which, according to its chemical composition, may be called a "tetraethyl-methylphenyl-pararosaniline") into my new sulphonated coloring-matter, possessing acid properties, and therefore capable of dyeing in an acid bath, the known methods of sulphonization may be employed. Practical results are obtained by treating the said basic coloring-matter with fuming sulphuric acid at a temperature requiring to be regulated according to the strength of the sulphuric acid employed. The action of rectified sulphuric acid produces inferior results on account of its requiring the assistance of a temperature exceeding 100° centigrade, and thus liable of injuring the coloring-matter, while fuming sulphuric acid effects the desired sulphonization at a considerably lower temperature, and even without any external application of heat.

As an example, I proceed as follows: About one part, by weight, of the basic rosaniline derivative (produced, as before described, by the condensation of tetraethyldiamidobenzophenone with methyldiphenylamine) is added in the state of a dry powder in the cold, and in very small portions at a time, to about four to five parts, by weight, of fuming sulphuric acid containing about thirty per centum of free sulphuric anhydride. The acid mixture is externally surrounded with ice, and care is taken to prevent any rise of its temperature beyond 10° centigrade. The acid melt thus obtained, after being first allowed to stand at a temperature of about from 15° to 20° centigrade during the space of about twelve hours, is afterward carefully diluted with about twenty times its own volume of ice-cold water. Part of the free sulpho-acid precipitates, and the sulpho-acid which remains in solution separates completely on partial neutralization with caustic-soda liquor. The precipitated coloring-matter is separated from the solution by decantation, then dissolved in warm dilute ammonia, and, after cooling, filtered and precipitated with common salt. The flocculent precipitate thus obtained is then filtered, pressed, and dried.

The sulphonated dye-stuff or coloring-matter produced in the usual mercantile form of a sodium salt, as before described, presents the following characteristics: It has the appearance of a dark-blue powder, possessing a bronze-like luster, easily soluble in water with a bright bluish-purple color. By the addition of caustic alkalies the said purple color of the aqeuous solution becomes gradually destroyed, but is restored upon neutralizing the free alkali with a mineral or organic acid. Rectified sulphuric acid dissolves the dye-stuff with a yellowish-red color, which upon the addition of water turns blue, a dark-blue precipitate of the free sulpho-acid being formed at the same time. Strong hydrochloric acid produces a red-brown solution. By submitting an intimate mixture of the dye-stuff with lime to destructive distillation a basic oil distills over possessing a characteristic disagreeable smell, and partly insoluble in dilute hydrochloric acid, the insoluble portion of the same developing a blue color in the presence of nitric acid.

The dyeing properties of my new sulphonated purple resemble those of the well-known sulphonated derivatives of aniline-blue generally known under the name of "alkali blue," inasmuch as it is capable of becoming fixed upon animal fiber in an alkaline dye-bath. It, however, differs from the said alkali blue by imparting in the alkaline bath its characteristic purple shade to the material to be dyed, while alkali blue becomes fixed under the same circumstances in the form of colorless saline compounds, which require an after-treatment with acids in order to develop the characteristic shade.

By passing the material dyed with my new coloring-matter through an acid bath, a slightly brighter shade may be obtained.

What I claim as new, and desire to secure by Letters Patent, is—

As a new product, the purple dye-stuff or coloring-matter, which in an alkaline bath imparts to the material to be dyed its characteristic purple shade, and which, when intimately mixed with lime and then submitted to destructive distillation, produces a basic oil possessing a characteristic disagreeable smell, substantially as specified.

In testimony whereof I have hereunto set my hand in the presence of two subscribing witnesses.

CARL LUDWIG MÜLLER.

Witnesses:
HENRY SCHAEPPI,
J. F. MONAGHAN.